(12) United States Patent
Hasegawa et al.

(10) Patent No.: US 6,708,795 B2
(45) Date of Patent: Mar. 23, 2004

(54) STEERING DAMPER SYSTEM

(75) Inventors: Yosuke Hasegawa, Saitama (JP);
Takeyasu Itabashi, Saitama (JP); Kanji Hayashi, Saitama (JP); Takeshi Wakabayashi, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/108,722

(22) Filed: Mar. 29, 2002

(65) Prior Publication Data
US 2002/0157909 A1 Oct. 31, 2002

(30) Foreign Application Priority Data

Apr. 6, 2001 (JP) .................. 2001-109122
May 25, 2001 (JP) .................. 2001-156749
Sep. 7, 2001 (JP) .................. 2001-272693

(51) Int. Cl.[7] .................. B62D 5/06; B62D 61/02
(52) U.S. Cl. .................. 180/423; 180/219
(58) Field of Search .................. 180/218, 219, 180/422, 423; 280/270

(56) References Cited

U.S. PATENT DOCUMENTS

| 4,811,807 A | | 3/1989 | Schier | |
|---|---|---|---|---|
| 2002/0152832 A1 | * | 10/2002 | Hasegawa et al. | 74/551.8 |
| 2002/0175489 A1 | * | 11/2002 | Hasegawa et al. | 280/272 |
| 2003/0047904 A1 | * | 3/2003 | Hasegawa et al. | 280/272 |
| 2003/0127824 A1 | * | 7/2003 | Hasegawa et al. | 280/272 |

FOREIGN PATENT DOCUMENTS

| JP | 2593461 B2 | 4/1987 |
|---|---|---|
| JP | 63-064888 A | 3/1988 |
| JP | 7-165148 A | 6/1995 |
| JP | 7-74023 B2 | 8/1995 |
| WO | 86/03267 A1 | 6/1986 |

* cited by examiner

*Primary Examiner*—Lesley D. Morris
*Assistant Examiner*—Matthew Luby
(74) *Attorney, Agent, or Firm*—Birch, Stewart, Kolasch & Birch, LLP

(57) ABSTRACT

To generate a damping force in a steering damper only upon an unintentionally caused handle action when it is truly necessary to restrain the turning of the handle, according to whether the cause of a handle action is intentional or unintentional. A rotation type steering damper is provided coaxially with a steering shaft, and the generation of a damping force or zero damping force is selected through a changeover by a variable valve provided in a bypass passage for communication between a right liquid chamber and a left liquid chamber of the steering damper. The changeover is controlled by a control device, which functions based on the direction of a moment exerted on the steering shaft detected by a moment sensor and the magnitude and direction of a rotational angular velocity concerning the turning of the steering shaft detected by a rotational angular velocity sensor, for controlling a damping force that is generated only when an unintentionally caused handle turning action opposite in direction to the moment is present and the rotational angular velocity has exceeded a predetermined threshold value.

3 Claims, 9 Drawing Sheets

STEERING DAMPER SYSTEM

CROSS-REFERENCE TO RELATED APPLICATIONS

The present application claims priority under 35 USC 119 to Japanese Patent Application Nos. 2001-109122 filed on Apr. 6, 2001 2001-156749 filed on May 25, 2001 and 2001-272693 filed on Sep. 7, 2001 the entire contents thereof are hereby incorporated by reference.

BACKGROUND OF THE INVENTION

1. Field of the Invention

The present invention relates to a steering damper system for a motorcycle for damping a swing of the handle during operation, and more particularly to a steering damper system that can vary the damping force.

2. Description of Background Art

Steering damper systems for generating a damping force to prevent the swing of the handle due to a kick-back at the time of a disturbance or the like, have been known (one example is Japanese Patent No. 2593461). In addition, technologies in which a damping force is variable so that the damping force is generated only when it is needed and that needless damping forces are not generated in other situations are also known. For example, a technology is known in which the damping force is controlled based on a steering angle and operating velocity (Japanese Patent Laid-open No. Sho 63-64888). In addition, a technology is known in which the damping force is controlled based on variations in front-wheel load (Japanese Patent Publication No. Hei 7-74023).

According to the damping force control methods of the prior-art examples, it is impossible to discriminate whether the cause generating a swing of the handle is an external cause such as a disturbance or an intentional operation caused by the rider. Therefore, even when the rider intentionally operates the handle during cornering, a damping force might be generated if a predetermined condition is established, whereby the handle load would be enlarged. Accordingly, the most preferable thing as a steering damper system is to generate the damping force only upon an unintentional cause such as a disturbance and not to generate the damping force in other situations.

SUMMARY AND OBJECTS OF THE INVENTION

However, even including the above prior-art examples, a steering damper system does not exist which enables a control according to the contents of the handle operation. It is desired to perform such a control that an appropriate damping force can be obtained according to the contents of the handle operation. Further, it is considered that if the damping force is varied according to variations in vehicle velocity or vehicle acceleration, it is possible to generate a damping force suitable for the active will of the rider. Accordingly, it is an object of the present invention to realize a steering damper system which can generate a damping force suitable for the active will of the rider.

In order to solve the above-mentioned problems, a first aspect of the invention pertaining to the steering damper system of the present application includes a steering damper system for exerting a damping force on a turning action of a front wheel steering system supported at a front portion of a vehicle body. With the damping force being variable, a rotational angular velocity of the steering system is generated by an unintentionally caused turning action and a moment is intentionally exerted on the steering system in the opposite direction so as to restrain and measure the unintentional turning action. The damping force of the steering damper is eliminated or reduced when the load direction of the moment and the turning direction of the steering system are in the same direction.

At this time, while the damping force of the steering damper is eliminated or reduced when the direction of the moment and the turning direction of the steering system are in the same direction, a damping force may be generated or increased in the steering damper when the direction of the moment and the turning direction of the steering system are in opposite directions. Further, a damping force may be generated in the steering damper when the rotational angular velocity has exceeded a predetermined threshold value.

In addition, a damping force may be generated in the steering damper when the direction of the moment and the turning direction of the steering system are in opposite directions and the load of the moment has exceeded a predetermined threshold value. Furthermore, in the controls where the direction of the moment and the turning direction of the steering system are in the same direction or in opposite directions, a condition wherein the rotational angle exceeds a predetermined threshold value may be added to the control conditions.

A second aspect of the invention includes a steering damper system for exerting a damping force on a turning action of a front wheel steering system supported at a front portion of a vehicle body. With the damping force being variable by a damping force variable means, the damping force variable means varies the magnitude of the damping force through a multistage changeover according to the vehicle velocity, vehicle acceleration or both the vehicle velocity and vehicle acceleration.

According to the present invention, a control means for operating the damping force variable means is provided wherein the control means changes over the damping force variable means in a multistage manner according to a plurality of predetermined velocity threshold values concerning the vehicle velocity or a plurality of predetermined acceleration threshold values concerning the vehicle acceleration. The acceleration threshold values include a function of the vehicle velocity which decreases as the vehicle velocity increases. Furthermore, a constitution may be adopted in which the damping force variable means is fixed in a predetermined changeover position within the multistage changeover range when a changeover of the damping force cannot be achieved notwithstanding a condition for changing over the damping force is present.

The steering damper system according to the first aspect of the present invention performs a control based on the moment exerted on the handle and the rotational angular velocity. Therefore, when the direction of the moment and the turning direction of the handle are in the same direction, for example, when the rider performs an intentional turning operation on the handle at the time of cornering, the direction of the moment exerted on the handle and the turning direction of the steering system coincide with each other. This results in the detection wherein the current operation is an intentional handle operation by the ride. As a result, the damping force is eliminated or reduced, irrespective of the magnitude of the moment and the rotational angular velocity. Therefore, the damping force is not generated or is reduced upon the rider's intentional handle operations at the time of stopping, managing or running the motorcycle or the like situations, whereby a light handle operation is realized. Moreover, it is possible to restrain the generation of needless damping forces, according to the handle operation conditions.

In addition, the damping force can be generated or increased only when the moment and the turning direction of the steering system are in opposite directions. For example, when a turning action is generated in the steering system due to a disturbance from the road surface at the time of operation, the turning direction of the steering system and the direction of the moment exerted on the steering system by the rider so as to restrain the turning action are different. Therefore, it is detected that the current action of the steering system is an unintentional action, and a damping force is generated or increased in the steering damper. As a result, the turning action of the steering system due to the disturbance from the road surface or the like can be restrained. Therefore, there is realized a steering damper system which can restrain the turning of the steering system by the damping force only when it is needed, according to the actual conditions at the time of operation and which can generate an appropriate damping force without being against the active will of the rider.

Further, when a predetermined threshold value is set concerning the rotational angular velocity and a damping force is generated or increased in the steering damper only when the threshold value has been exceeded, the steering damper can be made to function selectively only to such an excessive disturbance of disturbances from the road surface that might lead to kick-back, and, as a result, the generation of needless damping forces can be restrained more securely.

When a condition wherein the load of the moment exceeds a threshold value is added to the condition for the control in the case where the direction of the moment and the turning direction of the steering system are opposite, a further appropriate control is realized. The same result can be obtained also when a condition that the rotational angle exceeds a predetermined threshold value is added to the conditions for the controls in the case where the direction of the moment and the turning direction of the steering system are the same or opposite.

The second aspect of the invention resides wherein the damping force variable means varies the magnitude of the damping force in a multistage manner according to vehicle velocity, vehicle acceleration or both of vehicle velocity and vehicle acceleration. Therefore, a damping force of a required magnitude can be appropriately given to the steering damper in response to a required running condition, in relation to the vehicle velocity and the vehicle acceleration, and, therefore, there is realized a steering damper system which can generate an appropriate damping force without being against the active will of the rider.

Generally, when the vehicle velocity is low, the vehicle acceleration is high and, therefore, kickback would easily occur. In view of this, when a control device for changing over the damping force variable means is set so as to perform a control in a multistage manner according to a pluralities of predetermined velocity threshold values or acceleration threshold values, it is possible to obtain an appropriate damping force according to the vehicle velocity or the vehicle acceleration.

In this case, when an acceleration threshold value is made to be a function of vehicle velocity which decreases as the vehicle velocity increases and the damping force is controlled based on the acceleration threshold value, the acceleration threshold value is higher on the lower-velocity side. Therefore, a large damping force can be generated only when the vehicle acceleration is great as compared to the vehicle velocity in a comparatively lower velocity region. Therefore, an appropriate damping force based on the correlation between vehicle velocity and vehicle acceleration can be generated to prevent kick-back, according to the actual situations of a motorcycle such that a large vehicle acceleration is generated at the time of low vehicle velocity, to reduce the front-wheel load, leading to a result wherein the kick-back would easily occur.

Furthermore, when the damping force variable means cannot change over the damping force notwithstanding a condition when the changing over of the damping force is present, the changeover position is fixed in a predetermined region within a changeover range that is varied in a multistage manner, so that a predetermined damping force can be generated even in such a situation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
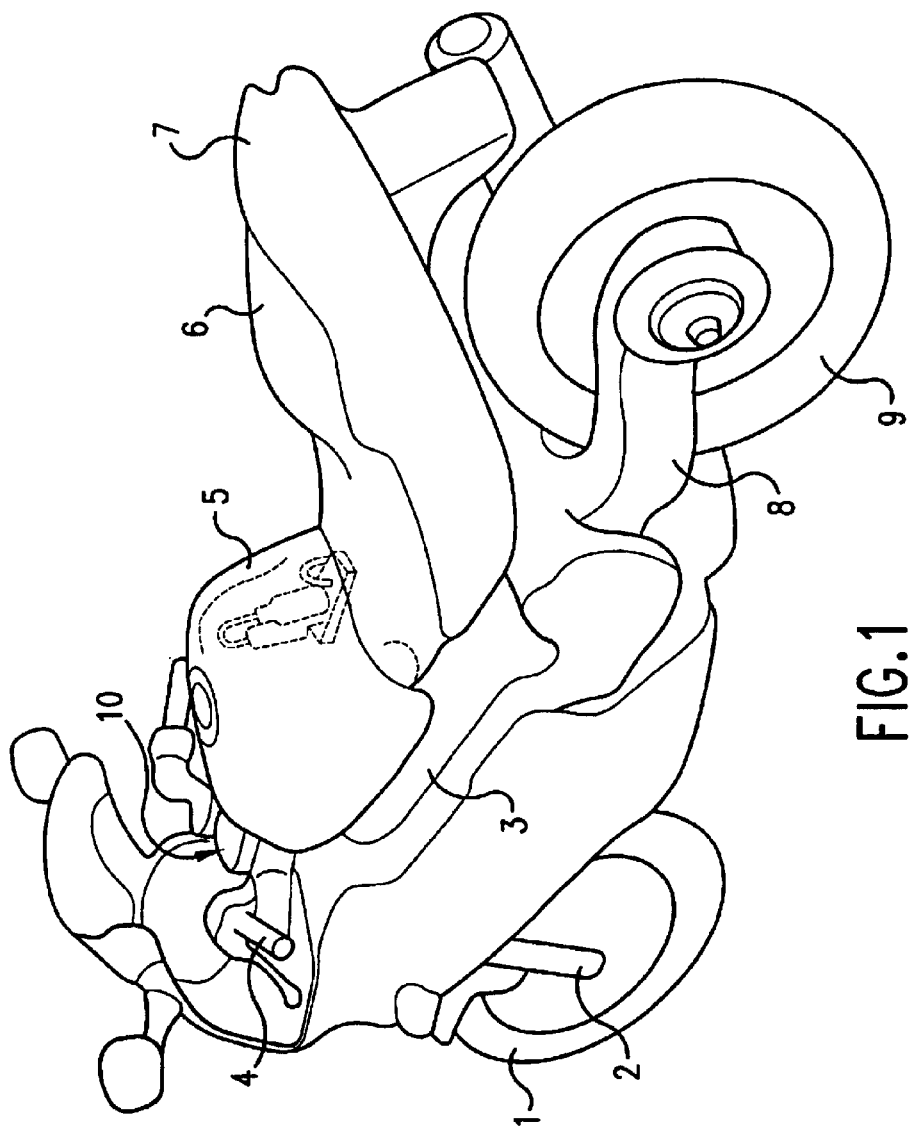
FIG. 1 is a perspective view of a motorcycle according to a first embodiment of the present invention.

In FIG. 1, an upper portion of a front fork 2 supporting a front wheel 1 at its lower end is connected to a front portion of a vehicle body frame 3, and is freely turnable by a handle 4. A fuel tank 5 is supported on the vehicle body frame 3. A seat 6, a rear cowl 7, a rear swing arm 8, and a rear wheel 9 are operatively connected to the vehicle body frame 3.

Figure 2:
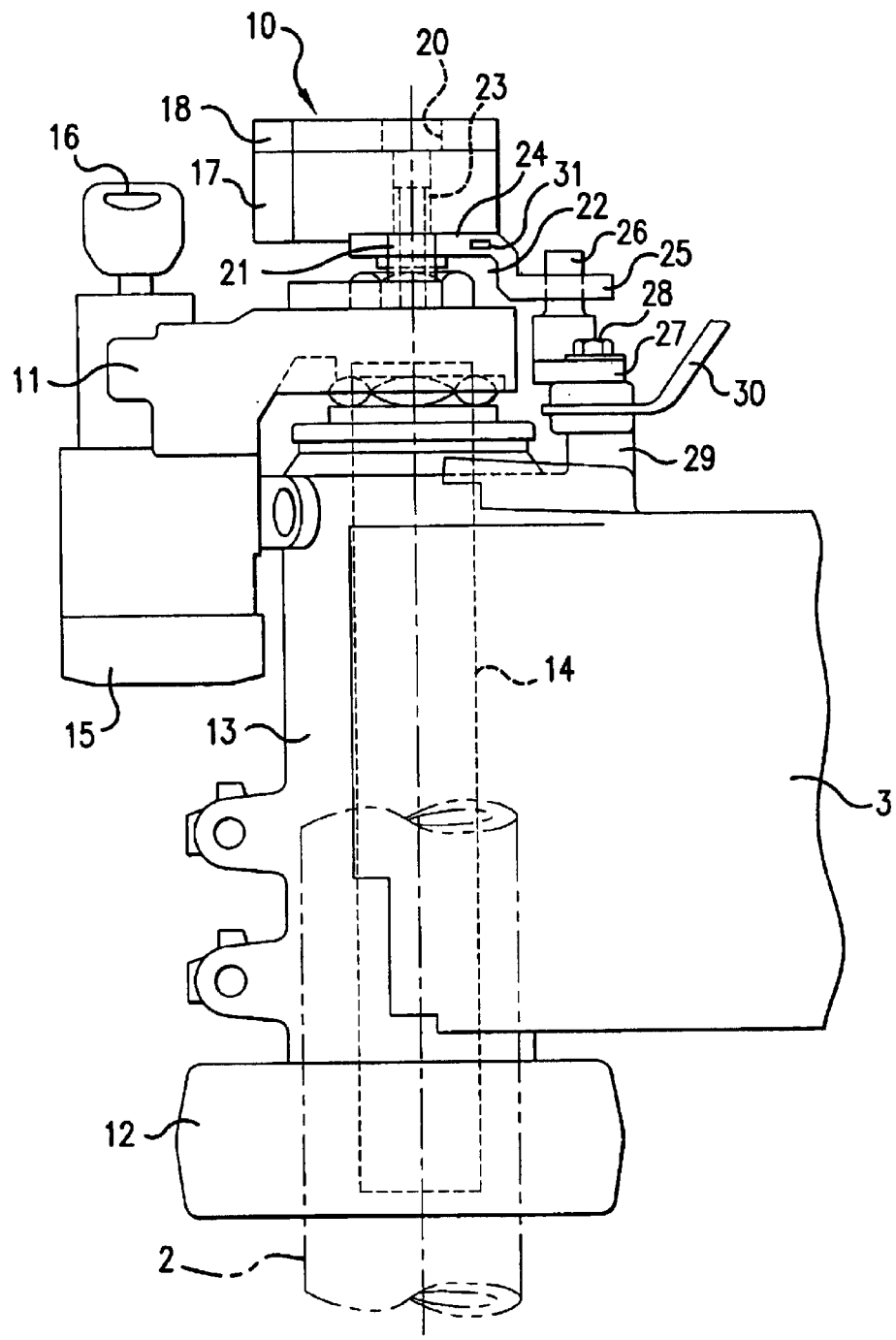
FIG. 2 is a side view of a front portion of a vehicle body showing a steering damper system portion.
Figure 3:
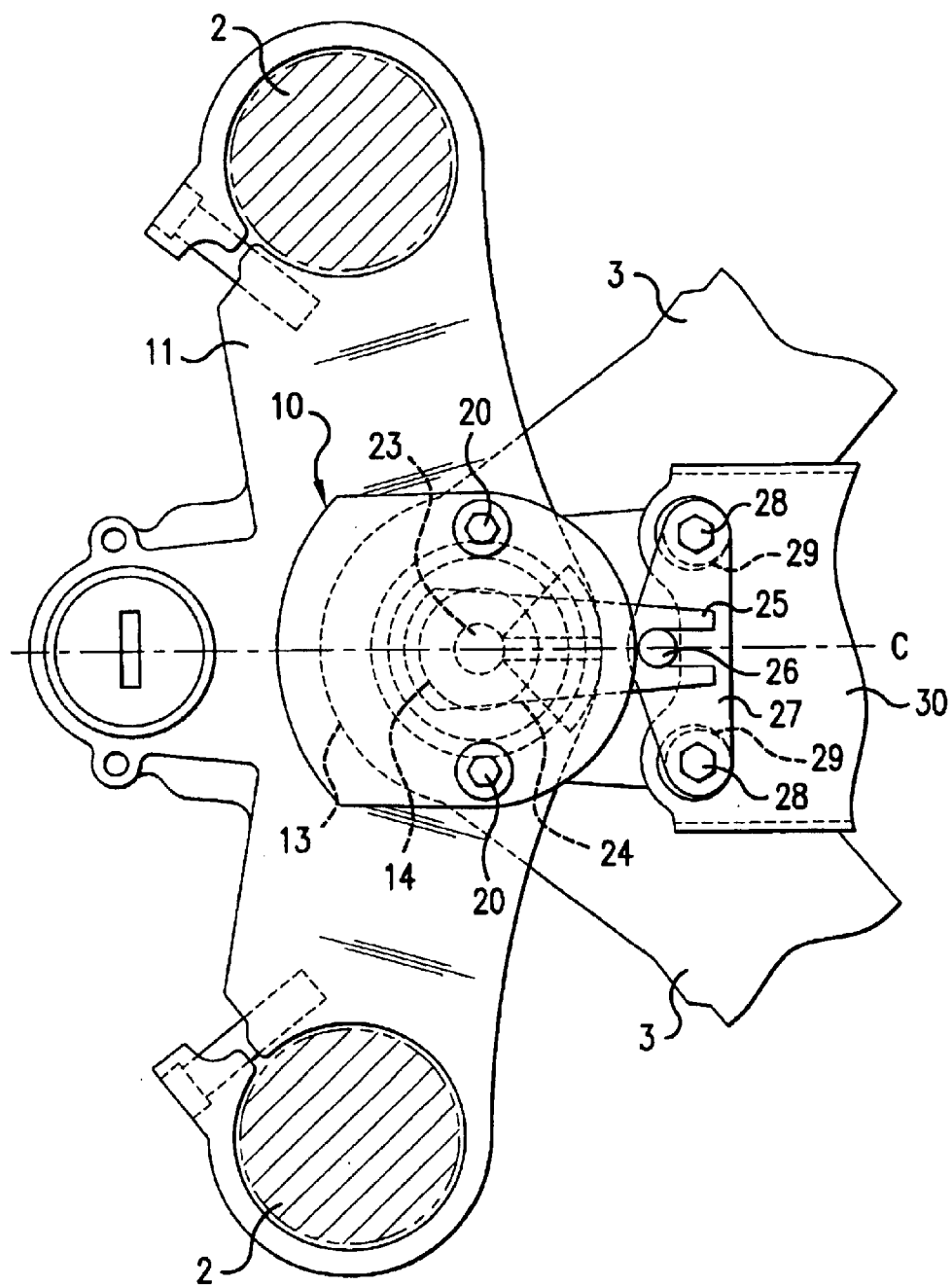
FIG. 3 is a plan view of the same.

Next, the steering damper will be described. As shown in FIGS. 2 and 3, the steering damper 10 is provided between a top bridge 11 fitted with the handle 4 and a front end portion of the vehicle body frame 3. The top bridge 11 is a member integrated with a bottom bridge 12 on the lower side so as to clamp therebetween a steering shaft 14 (represented by a center line) supported on a head pipe 13. The top bridge 11, the bottom bridge 12 and the steering shaft 14 are turned as one body.

Upper portions of a left-right pair of the front-fork portions of the front fork 2 are supported on the top bridge 11 and the bottom bridge 12. The head pipe 13 is a pipe-shaped portion integrated with a front end portion of the vehicle body frame 3, and the vehicle body frame 3 extends rearwardly from the head pipe 13 in the form of a left-right pair (FIG. 3). A handle lock 15 supported by the top bridge 11 is provided on the front side of the head pipe 13, and is unlocked by a key 16.

The handle lock 15 is for non-turnably fixing the handle 4 to the vehicle body side at the lime of parking, and is integrated with a main switch being a switch for an electrical system for turning ON/OFF a power source for an engine ignition system, a lamp system and the like. The key 16 has both the function for unlocking the handle lock 15 and the function for changing over the main switch.

The steering damper 10 in the present embodiment is a liquid pressure type damper for preventing kick-back, comprises a main body portion 17 and a cover 18, and is fastened to a nut portion provided at a boss 21 on the top bridge 11 by bolts 20. At this time, the main body portion 17 and the cover 18 are also integrated by the bolts 20. A nut 22 is provided for connecting the top bridge 11 and the upper end of the steering shaft 14.

A shaft 23 is provided inside of the steering damper 10 with its axis directed in the vertical direction in FIG. 2, and the lower end of the shaft 23 extends downwards from the main body portion 17, to be integrated with the front end of an arm 24. The shaft 23 is disposed coaxially with the steering shaft 14.

The arm 24 is bent in a crank form in side view and extends in the front-rear direction through the center of the vehicle body in plan view, and its front end portion projects to the upper side of the nut 22 to be integrated with the shaft 23 projecting into the steering damper 10. A rear end portion of the arm 24 is a bifurcated portion 25, in which a boss portion 26 on the side of the vehicle body frame 3 is fitted.

The boss portion 26 projects upwardly over a central portion of a bracket 27, and the bracket 27 has both its left and right ends fitted to bosses 29 (FIG. 2) that are attached on the rear side of the head pipe 13 at the center of a front end portion of the vehicle body frame 3, by bolts 28. A stay 30 projects from the front end of the fuel tank 5 and is co-fastened onto the bosses 29 by the bolts 28. The boss portion 26 and the shaft 23 are located on the center line C of the vehicle body. A moment sensor 31 is fitted to a side portion of the arm 24, for detecting the turning moment of the handle.

Figure 4:
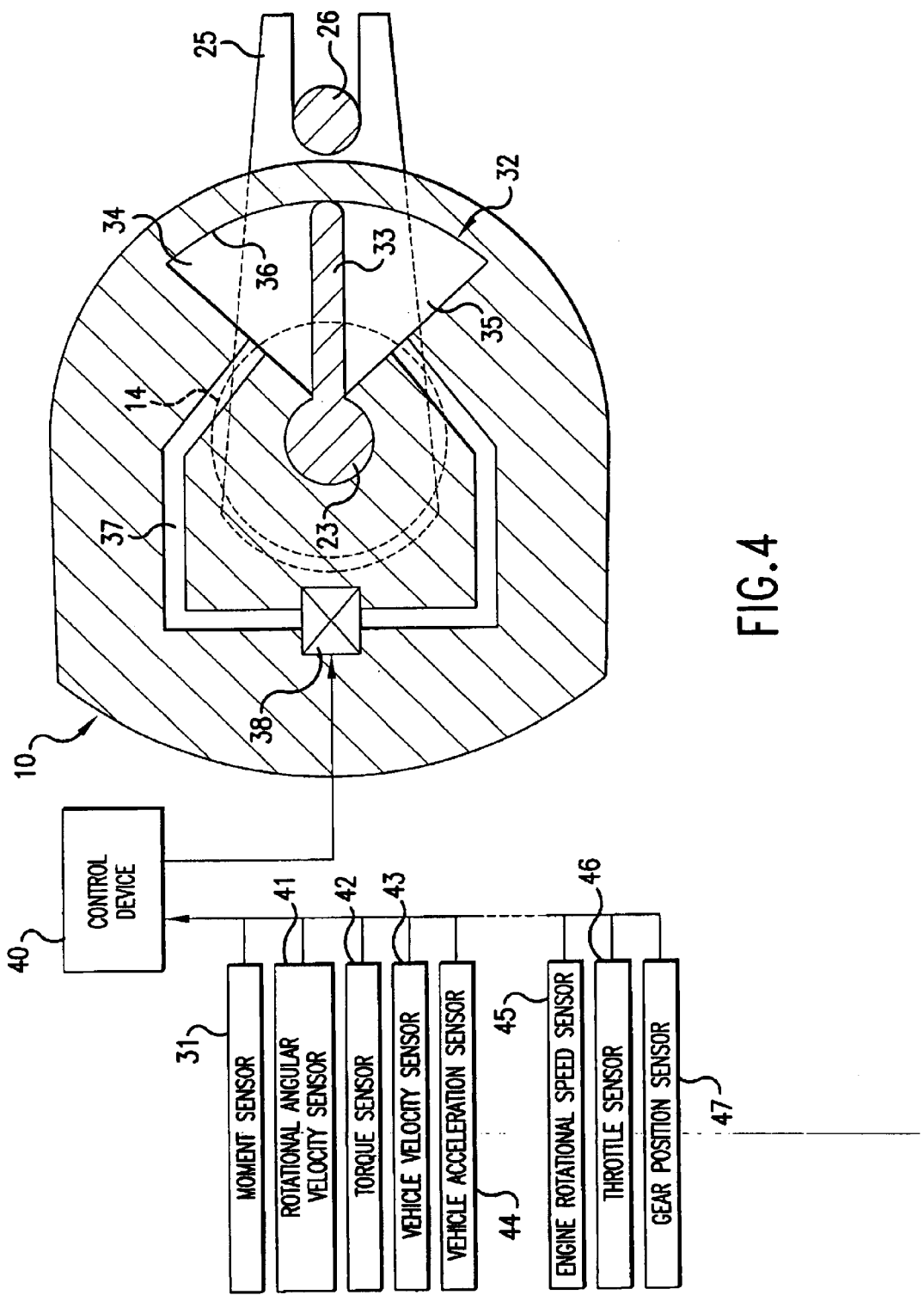
FIG. 4 is a view showing a general structure of a steering damper.

FIG. 4 generally shows the structure of the steering damper 10. The steering damper 10 is provided in the inside thereof with a liquid pressure chamber 32 in a sector shape widened toward the rear side, the shaft 23 is located at a position corresponding to the center of the sector, and the inside of the liquid pressure chamber 32 is bisected into a right liquid chamber 34 and a left liquid chamber 35 by a partition wall 33 integrally extending rearwardly from the shaft 23 in a wing form.

The tip of the partition wall 33 forms a sliding surface, which maintains a sliding contact with the inside surface of an arch-shaped wall 36 of the liquid pressure chamber 32. An incompressible liquid such as oil is sealed in the right liquid chamber 34 and the left liquid chamber 35, which are connected to each other by a bypass passage 37. A variable valve 38 is provided at an intermediate portion of the bypass passage 37. The variable valve 38 has a restriction passage for generating a damping force, and the restriction is variable by varying the cross-sectional area of the restriction passage. The variable valve 38 is not limited to such a structure and various known valves can be adopted. An example of the variable valve 38 composed of an electromagnetic solenoid will be shown in FIG. 6 of a second embodiment which will be described later.

The restriction of the variable valve 38 is controlled by a control device 40. The control device 40 includes a microcomputer or the like that performs a control based on detection signals from a moment sensor 31 and a rotational angular velocity sensor 41 for detecting the direction of a turning torque exerted on the steering shaft 14 from the moment M and for detecting the magnitude of the rotational angular velocity ω and the turning direction of the steering shaft 14 from the rotational angular velocity ω, and varies the restriction of the variable valve 38 to regulate the damping force when the detected data are in a predetermined condition.

The predetermined condition is such that a damping force is generated when the direction of the moment M and the turning direction of the steering shaft 14 are opposite to each other and the absolute value of the rotational angular velocity ω has exceeded a predetermined threshold value and the damping force is eliminated in other situations. The setting of the threshold value can be conducted arbitrarily according to the specifications of the vehicle and the like and is made so that a control is performed only upon the generation of a particularly great disturbance which would lead to kickback.

The moment sensor 31 is composed of a known strain gage or the like. When a damping force is generated in the steering damper 10 at the time of the turning of the handle 4, the damping force is transmitted through the partition wall 33 and the shaft 23 to the arm portion 24 and tends to contract or extend the moment sensor 31. Therefore, the absolute value of the moment M can be detected from the magnitude of the deformation of the moment sensor 31 and the direction of the moment M can be detected from whether the deformation is compressed or extended. In the present embodiment, the deformation in the compressed direction of the moment sensor 31 corresponds to a leftward turning, and the deformation in the extended direction corresponds to a rightward turning. The strain gage may be located at any portion where a moment is generated, such as the handle 4.

The rotational angular velocity sensor 41 is a known sensor using an electric resistance or the like that is contained in the steering damper 10 and is disposed in the vicinity of the shaft 23 for detecting the rotational angular velocity ω concerning the relative turning between the shaft 23 and the main body portion 17 side of the steering damper 10. The rotational angular velocity sensor 41 may be disposed in the vicinity of the steering shaft 14 on the side of the head pipe 13 or the top bridge 11, to detect the rotational angular velocity ω concerning the turning of the steering shaft 14. If required, the control device 40 is further supplied appropriately with detection signals from various sensors such as a torque sensor 42 for the steering shaft 14, a vehicle velocity sensor 43, a vehicle acceleration sensor 44 and the like.

In the second embodiment which will be described later, detection signals are also inputted, as required, from various sensors such as, for example, an engine rotational speed sensor 45, a throttle sensor 46 and a gear position sensor 47 which constitutes a sensor group of an electronic fuel injection system.

Next, an action or operation of the present embodiment will be described. At the time of operation of the vehicle in a straight forward direction, the rider holds the handle in a neutral position, but the front wheel 1 performs an oscillating movement with minute angles due to self-alliance. Although this oscillating movement also leads to an unintentionally caused turning action exerted on the steering system, such a minute vibration does not cause the rotational angular velocity ω detected by the rotational angular velocity sensor 41 to reach the threshold value, so that the control device 40 does not cause generation of a damping force, irrespective of the relationships with the moment M.

In this condition, if the angle of the front wheel 1 is largely swung to the left or the right due to a large disturbance which might lead to kick-back, the steering shaft 14 shows an unintentionally caused turning to that direction, and, therefore, the steering damper 10 is also turned in the same direction as one body with the top bridge 11, with the shaft 23 as a center.

Figure 5:
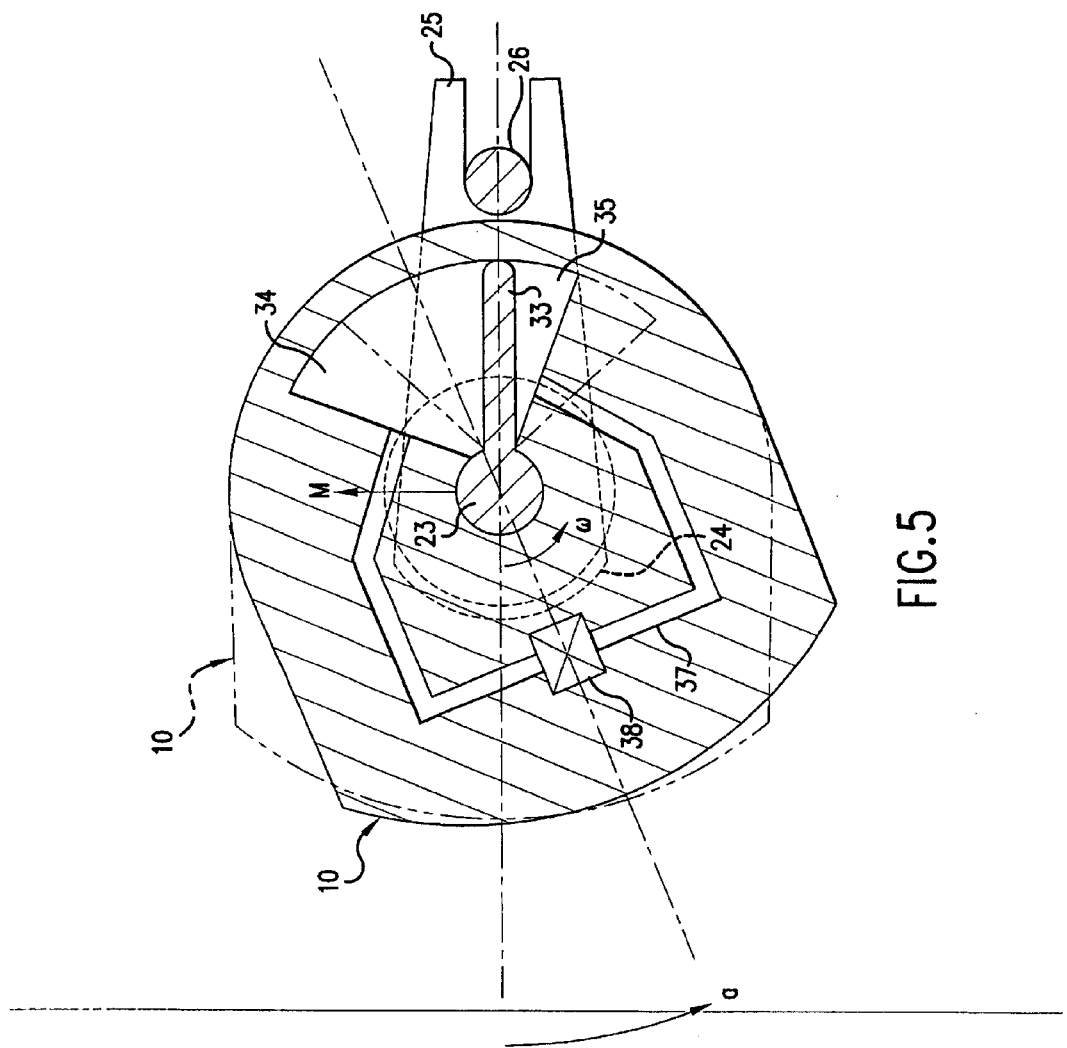
FIG. 5 is a view showing an action or operation.

As shown in FIG. 5, if the top bridge 11 is turned to the left as indicated by arrow a, the steering damper 10 also is turned in the direction of arrow a. In this case, since the shaft 23 is fitted to the arm 24 and is fixed on the center of the vehicle body, the shaft 23 together with the partition wall 33 rests unmoved. Therefore, the arch-shaped wall 36 is turned to the right side as indicated by imaginary lines while making sliding contact with the tip of the partition wall 33, and the volume of the left liquid chamber 35 is reduced, so that surplus liquid tends to move through the bypass passage 37 into the right liquid chamber 34.

At this time, the rotational angular velocity sensor 41 detects a rotational angular velocity ω concerning a leftward turning due to the relative turning of the steering damper 10, which is turned to the left as one body with the top bridge 11, and the shaft 23. Moreover, the rotational angular velocity ω exceeds the threshold value. On the other hand, the rider tends to maintain the handle in the straight forward condition in response to the disturbance, and, therefore, intentionally exerts a rightward turning torque (opposite to the disturbance) on the steering shaft 14. As a result, the gage constituting the moment sensor 31 experiences a deformation in the extension direction, and thereby detects the rightward turning moment M.

Therefore, the direction of the moment M intentionally exerted on the steering system and the turning direction of the steering shaft 14 generated by the disturbance which is an unintentional cause are opposite to each other, and the rotational angular velocity ω exceeds the predetermined threshold value. Thus, the predetermined condition for generating a damping force is satisfied. Accordingly, the control device 40 varies the variable valve 38 to the restriction side, whereby the flow resistance on the liquid in the bypass passage 37 is enlarged, and the damping force is increased. By this, the turning action of the steering shaft 14 and the steering system due to the disturbance exerted from the road surface or the like is restrained, and kick-back is prevented.

When the rider turns the handle, for example, to the left for cornering, the rider first turns the handle to the left and the direction of the moment M at this time is the leftward turning direction. In addition, the steering shaft 14 is turned to the left side, so that the rotational angular velocity (o is also in the leftward turning direction. Thus, the direction of the moment M and the turning direction of the rotational angular velocity o are the same, so that the predetermined condition is not satisfied, irrespective of the magnitude of the rotational angular velocity ω. Accordingly, the control device 40 detects the active operation by the rider and controls the variable valve 38 so as not to generate a damping force, thereby permitting the steering shaft 14 to be rotated lightly.

In the cornering of a motorcycle, for example, in the case of a leftward rotation, it is a common practice to first turn the handle momentarily to the opposite (rightward) direction to start cornering. In this case, also, the direction of the moment M and the turning direction of the rotational angular velocity ω coincide with each other, so that this is judged as an intentional handle operation of the rider, and a damping force is not generated. Similarly, as to the intentional handle operations of the rider at the times of stopping, managing or running the motorcycle or the like situations, a damping force is not generated because the operation in question is an active operation of the rider.

Therefore, there is obtained a system that can judge even the cause of a handle action, which has never been present. For an intentional handle operation by the rider, generation of needless damping force is restrained, and a light handle operation is realized. In response to a large disturbance which might lead to kick-back, it is judged that the current action is a handle action unintended by the rider, and the steering damper is caused to generate a damping force, whereby the influence of the disturbance or the like can be absorbed. Therefore, it is possible to generate a damping force in the steering damper only when it is truly needed according to the cause of the handle action, in conformity with the handle operation situations and the actual conditions at the time of operation of the vehicle. Thus, a steering damper system is realized -which can generate a damping force suitable for the active will of the rider.

The present embodiment is not limited to the above description, and various modifications or applications are possible within the principle of the invention. For example, while the damping force is controlled to be either eliminated (reduced to zero) or generated in the above-described embodiment, a control may be adopted in which the damping force is varied in a multistage manner or continuously so that the damping force is decreased when the moment M and the turning direction coincide with each other and that the damping force is increased when the moment M and the turning direction are opposite to each other.

In addition, since the detection of the moment has the same signification as the detection of the turning torque of the steering shaft 14, the detection of the moment M by the moment sensor 31 may be replaced by direct detection of the turning torque of the steering shaft 14. Similarly, the rotational angular velocity may also be detected directly as to the steering shaft 14 itself.

Furthermore, while a predetermined threshold value is set with respect to the rotational angular velocity ω, the control according to the cause of the handle operation as described above can be achieved without setting the threshold value. In addition, when a condition wherein the load of the moment exceeds a threshold value is added to the conditions for the control in the case where the direction of the moment and the turning direction of the steering system are opposite to each other, a further appropriate control is realized. Similarly, when a condition wherein the rotational angle exceeds a predetermined threshold value is added to the conditions for the control in the cases where the direction of the moment and the turning direction of the steering system are the same or opposite, a further appropriate control is realized.

Figure 6:
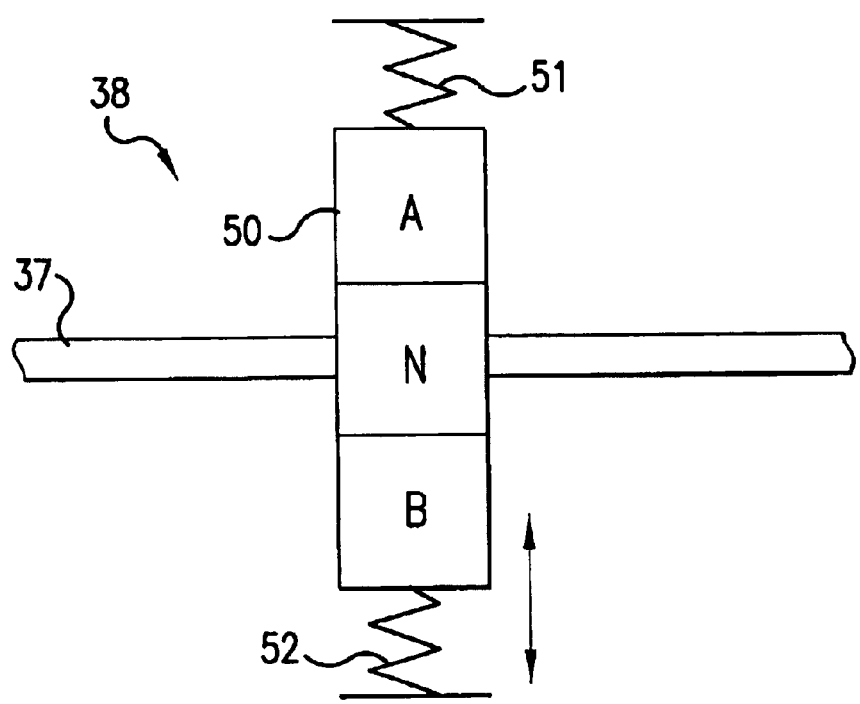
FIG. 6 is a model view of a variable valve according to a second embodiment.
Figure 7:
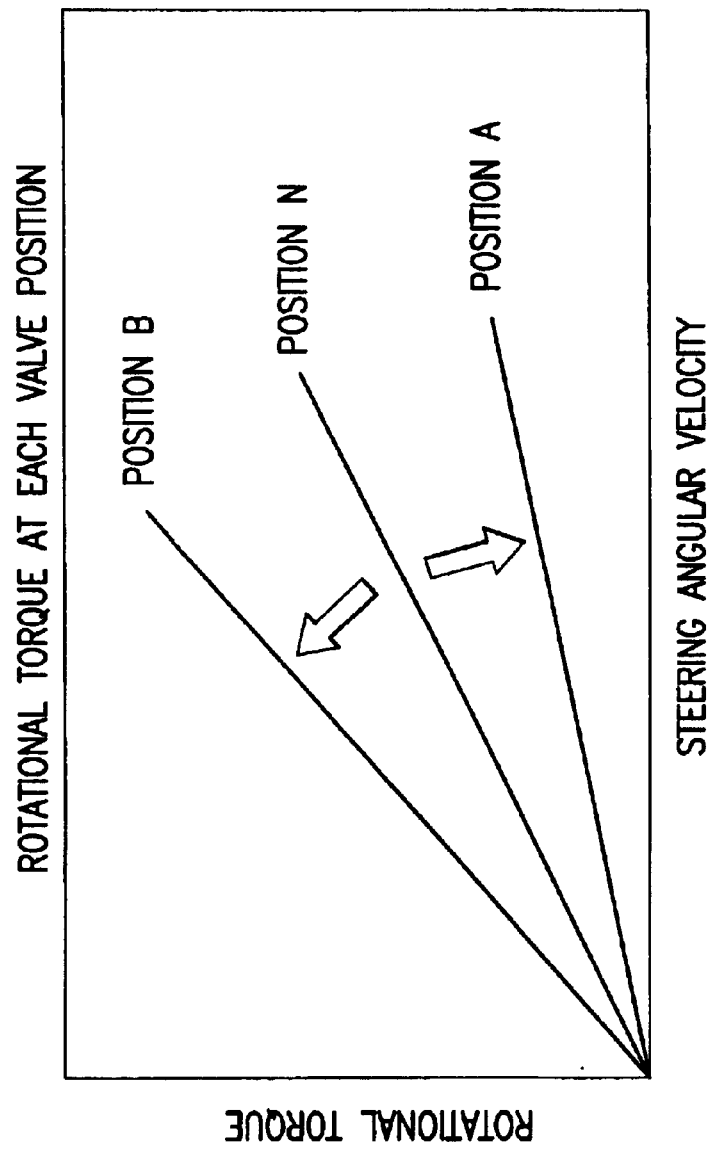
FIG. 7 is a diagram showing position settings of the variable valve according to a second embodiment of the present invention.
Figure 8:
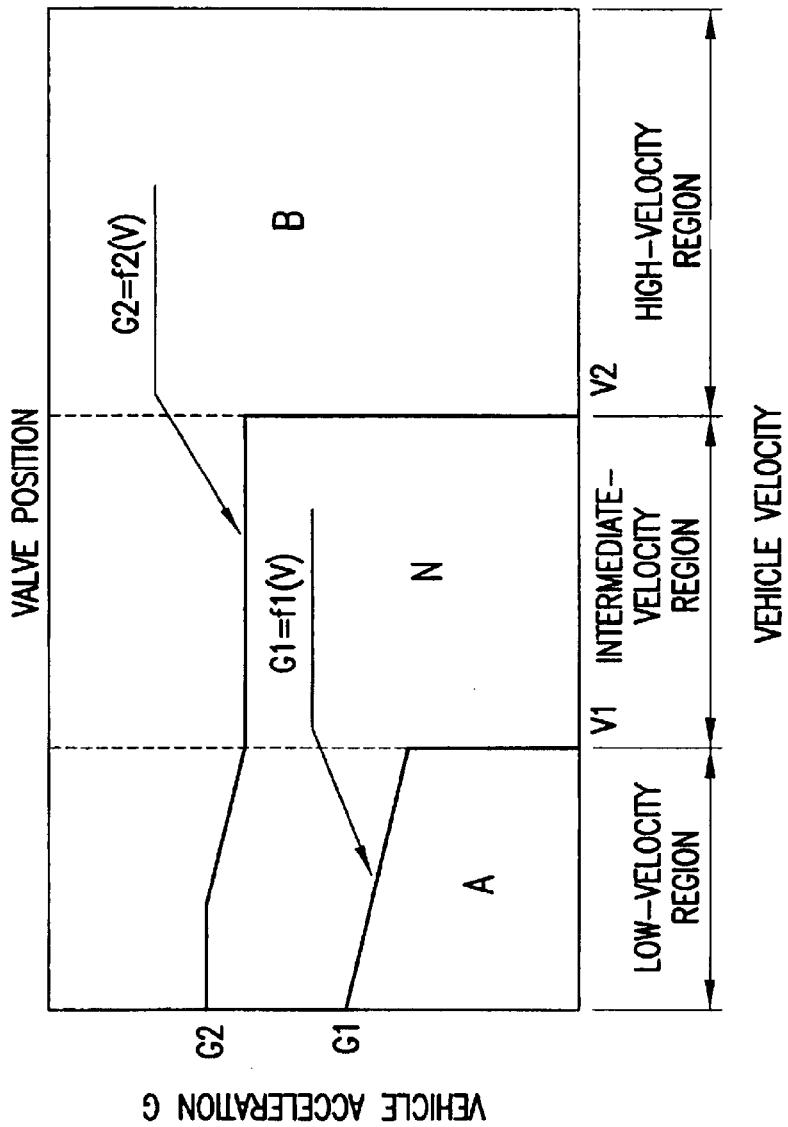
FIG. 8 is a diagram showing changeover settings of position according to the second embodiment.
Figure 9:
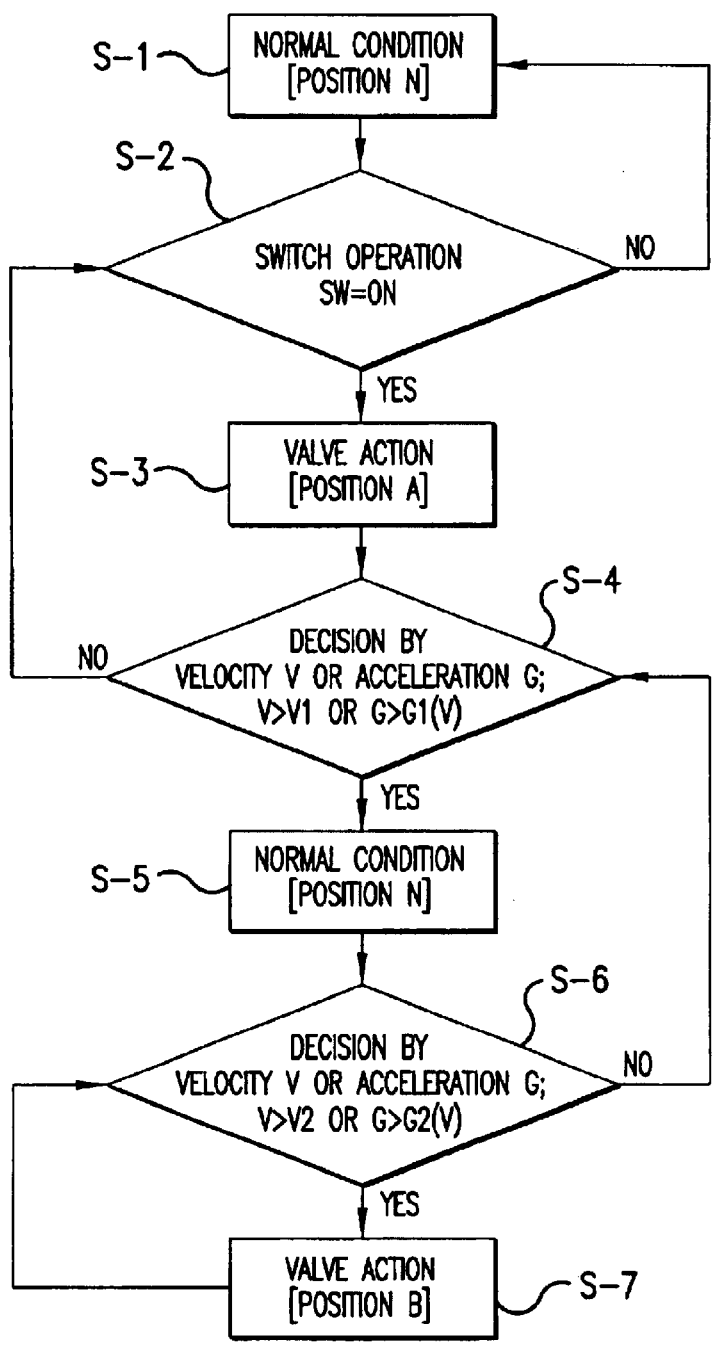
FIG. 9 is a flow chart of control according to the second embodiment.

Next, a second embodiment concerning the control method for damping force will be described. FIG. 6 is a model view showing the structure of a variable valve having three positions for three-stage changeover of damping force, FIG. 7 is a diagram showing the relationship between angular velocity of steering and rotational torque for each position, FIG. 8 is a diagram showing the position changeover timings in relation to vehicle velocity and vehicle acceleration, and FIG. 9 is a control flow chart of the control device. The structure of the steering damper, the control system and the structure of fitting the control system to the vehicle body are the same as in the previous embodiment; therefore, description thereof will be omitted, and common symbols will be used.

As shown in FIG. 6, the variable valve 38 is composed as an electromagnetic solenoid valve, with a plunger 50 that can be freely moved in the direction traversing the bypass passage 37 by electromotive forces. The variable valve 38 has three different positions of A, N and B along the longitudinal direction. Each of the positions is selectively connected to the bypass passage 37, to restrict the flow passage to different cross-sectional areas, thereby changing the damping force in three manners.

Namely, when a power source for excitation supplied to the variable valve 38 is turned OFF, the plunger 50 comes to a neutral position, and position N is communicated with the bypass passage 37. When the power source for excitation is turned ON and the plunger 50 is moved upwardly in FIG. 6 against a spring 51, position B is communicated with the bypass passage 37. Conversely, when the plunger 50 is moved downwards in FIG. 6 against a spring 52, position A is communicated with the bypass passage 37. Thus, the variable valve 38 is changed over in three positions.

The moving direction of the plunger 50 is selected by reversing the direction of the current supplied to the variable valve 38, and the changeover among the three positions is conducted by the control device 40. When the power source for excitation of the electromagnetic solenoid constituting the variable valve 38 is turned OFF, namely, when the variable valve 38 is not operated, position N is connected to the bypass passage 37 at a balanced point where the upper and lower springs 51 and 52 are in their normal condition. FIG. 6 shows this condition.

FIG. 7 is a graph showing the relationship between the rotational angular velocity of the steering shaft and the rotational torque for each position, in which the axis of the abscissa represents the rotational angular velocity of the steering shaft which represents the rotational angular velocity of the handle, and the axis of the ordinate represents the rotational torque of the steering which is the damping force generated by the steering damper. For each position, the variations of the rotational angular velocity of the steering shaft and the rotational torque are in a linear proportional relationship, but the inclinations differ, namely, the inclination is in the order of B>N>A. The difference in the inclination shows the difference in the magnitude of the damping force generated at each position of the plunger 50, and, since the damping force is greater as the inclination is greater, the magnitude of the damping force is in the order of B>N>A.

Among the positions, at position A the damping force is smallest, and this position gives priority to steerability so that the variation of the rotational torque of steering relative to the variation of the rotational angular velocity of the steering shaft is the smallest. On the contrary, at position B the damping force is greatest, and this position gives priority to stability so that the variation of the rotational torque of the steering relative to the variation of the rotational angular velocity of the steering shaft is the greatest. Position N is a normal setting where a damping force intermediate between those of positions A and B is generated to balance the steerability and stability, and this position is also a home position where the variable valve 38 is not operated.

FIG. 8 shows an example of the setting the changeover of each position. In FIG. 8, the axis of the abscissa is the vehicle velocity V, the boundary between a low-velocity region and an intermediate-velocity region is set to be a vehicle threshold value V1, and the boundary between the intermediate-velocity region and a high-velocity region is set to be a velocity threshold value V2. The axis of the ordinate is the vehicle acceleration G, and predetermined acceleration threshold values G1 and G2 (G1<G2) are set. The acceleration threshold value G1 is a function of vehicle velocity V of G1=f1(V), which is a rightwardly downward straight line gradually decreasing as the vehicle velocity V increases, and is changed to 0 at the velocity threshold value V1. The G1 on the axis of the ordinate is the value at a vehicle velocity of 0, and is a maximum, and f1 is a predetermined proportional constant.

Similarly, the acceleration threshold value G2 is a function of vehicle velocity V of G2=f2(V), which generally decreases gradually as the vehicle velocity V increases, and, from an intermediate portion in the low-velocity region, it steeply rightwardly slopes down on the intermediate-velocity region side. Hence, a bent line sloping down rightwardly on the whole. The acceleration threshold value G2 uniformly decreases in the intermediate-velocity region to be a rightwardly downward straight line, and is changed to 0 at the velocity threshold value V2. The G2 on the axis of ordinate is the value at a vehicle velocity of 0, and is a maximum, and f2 is a predetermined proportional constant. The acceleration threshold value as a function is represented as G(V).

As for the changeover of the position at which the variable valve 38 is connected to the bypass passage 37, the region where the vehicle velocity V is in the low-velocity region of less than the velocity threshold value V1 and the vehicle acceleration G is less than the acceleration threshold value G1(V), namely, V<V1 and G<G1(V), is set to be position A, and the region where the vehicle velocity V is greater than the threshold value V2 or the vehicle acceleration G is greater than the acceleration threshold value G2(V), namely, V>V2 or G>G2(V) is set to be position B. The intermediate region between the positions A and B is set to be position N.

The variable valve 38 is changed over on demand into one of the three positions A, N and B according to the operating conditions, in conformity with the correlation between vehicle velocity and vehicle acceleration based on the diagram. Namely, as a changeover control method, there may be adopted a method in which, based on the vehicle velocity only, up to the velocity threshold value V1 is set to be position A, from V1 to V2 is set to be position N, and the high velocity side of V2 is set to be position B. Besides, based only on the acceleration threshold values G1(V) and G2(V), changeover to each position may be set in the order of A, N and B in the increasing order of acceleration. In this case, since the acceleration threshold value G is a function of the vehicle velocity V, the latter control is substantially a control based on both the vehicle acceleration G and the vehicle velocity V. Furthermore, a control may be conducted based only on the acceleration threshold values G1 and G2 on the axis of ordinate, namely, only on the vehicle acceleration G.

In the control based on the acceleration threshold value G(V), in a low-velocity region, the region below the acceleration threshold value G1(V) is position A, the region between the acceleration threshold values G1(V) and G2(V) is position N, and the region above the acceleration threshold value G2(V) is position B. This is for performing a changeover so that the damping force is increased as the vehicle acceleration increases, in view of the fact that a large vehicle acceleration would be generated at a low vehicle velocity to reduce the front-wheel load, leading to an easy generation of the kick-back. The acceleration threshold values G1 and G2 are the points of multistage changeover of the damping force. The acceleration threshold values G1(V) and G2(V) may be arbitrarily set according to the use mode of the vehicle and the like. As for the velocity threshold values V1 and V2, also, the same as above applies.

Next, the flow of controlling the changeover of three positions of the variable valve 38 based on the velocity threshold values V1, V2 of vehicle velocity V or the acceleration: threshold value G(V) of vehicle acceleration G in the control device 40 will be described referring to FIG. 9. As shown in FIG. 4, the control device 40 is supplied with a vehicle velocity from the vehicle velocity sensor 43 and with a vehicle acceleration from the vehicle acceleration sensor 44. First, the variable valve 38 is preliminarily so set that the home position at a normal time is in the normal condition of position N, so that the starting condition immediately upon turning on the main switch of the vehicle is position N (S-1). In this condition, it is judged whether the power switch for the variable valve 38 is ON (SW=ON) or not (S-2), and if the answer is No, the process returns to S1. Namely, when the plunger 50 of the variable valve 38 is not operated by electromagnetic force, the variable valve 38 returns to position N without fail, and a damping force in the normal condition is generated.

If the power switch is ON, the plunger 50 of the variable valve 38 is operated to change over the variable valve 38 into position A corresponding to the smallest damping force, thereby setting the priority to steerability (S-3). Subsequently, vehicle velocity V or vehicle acceleration G is compared with the velocity threshold value V1 or the acceleration threshold value G1(V) to judge the relationship (S-4), and if V>V1 or G>G1(V), the plunger 50 of the variable valve 38 is again operated so as to obtain a greater damping force, thereby changing over the variable valve 38 into position N and setting the normal condition (S-5). If the condition is not satisfied, the process returns to S-2, and position A or N is again selected.

Following to S-5, vehicle velocity V or vehicle acceleration G is compared with the velocity threshold value V2 or the acceleration threshold value G2(V) to judge the relationship (S-6), and if V>V2 or G>G2(V), the plunger 50 of the variable valve 38 is again operated so as to obtain a further greater damping force, thereby changing over the variable valve 38 into position B and setting priority to stability (S-7), and then the process returns to S-6 and repeats the steps. If the condition is not satisfied in S-6, the process returns to S-2, and position A or N is again selected.

Thus, according to the present embodiment, the magnitude of the damping force is changed over in a multistage manner according to the velocity threshold values V1, V2 of vehicle velocity V or the acceleration threshold values G(V) of vehicle acceleration, so that a damping force of a required magnitude can appropriately be given to the steering damper at the time of a required running condition in relation to vehicle velocity and vehicle acceleration, and it is possible to realize a steering damper system which can generate a damping force suitable for the active will of the rider.

In addition, since the damping force can be changed over in a multistage manner according to the pluralities of predetermined velocity threshold values V1, V2 and acceleration threshold values G1(V), G2(V), it is possible to obtain an appropriate damping force according to vehicle velocity or according to vehicle velocity and vehicle acceleration. While a large vehicle acceleration would be generated in a low velocity region to reduce the front-wheel load, leading to easy generation of kick-back, when the acceleration threshold values G1 and G2 are so set as to decrease as the vehicle velocity increases, it is possible to generate an appropriate damping force even in such a situation and to prevent kick-back.

Furthermore, even when the plunger 50 cannot be changed over notwithstanding a condition for changing over the damping force by operating the plunger 50 is present, the plunger 50 is necessarily located in position N which is the home position, and a damping force corresponding to the normal condition is generated. Therefore, mis-generation of a damping force or generation of an excessively great or small damping force can be obviated. Such a home position is not limited to position N, and may be position A or B within the range where the damping force is varied in a multistage manner. Further, an exclusive home position may be set specially.

The present embodiment is not limited to the above-described structure, and various modifications and the like are possible. For example, the number of positions may be more than three. According to this, the velocity threshold values may be set more, such as not less than V3, and the acceleration threshold values may be set more, such as not less than G3(V). Besides, the number of regions for the multistage changeover may be more than the above-mentioned three regions.

Further, such a multistage changeover may be related to only one of the vehicle velocity and the vehicle acceleration. In the former case, the multistage changeover is based on the velocity threshold values V1, V2, and in the latter case, the multistage changeover is based only on the acceleration threshold values G1 and G2 which are values on the axis of ordinate in the graph of FIG. 8.

In addition to the above-mentioned temperature correction, various corrections may be added. For example, when correction is made by use of a throttle opening speed obtained by differentiating the throttle opening detected by a throttle opening sensor 35 with time, a correction of the damping force corresponding to vehicle acceleration variation can be achieved. Besides, when throttle opening is added to this, a further precise correction can be achieved.

In addition, in the case of discriminating the vehicle acceleration, information detected by other sensors used in an electronic fuel injection system can be utilized in place of the information detected by the acceleration sensor. As such means, for example, as shown in FIG. 4, the vehicle acceleration can be discriminated based on any of the engine rotational speed by an engine rotational speed sensor 45, the throttle opening and/or throttle opening speed by a throttle sensor 46, and the gear stage by a gear position sensor 47, and, when such means is adopted, it is unnecessary to provide the acceleration sensor or the like.

Where the vehicle acceleration is detected by an acceleration sensor, the damping force of the steering damper is changed over after a predetermined acceleration has been generated, and, thus, a time lag is generated. However, when the control is based on information detected by the above-mentioned sensor, for example, throttle opening detected by the throttle sensor 46, such a time lag is not generated, and the forecast of the generation of a vehicle acceleration can be achieved.

While the throttle sensor 46 detects the throttle opening, throttle opening speed is obtained by differentiating the throttle opening with time in the control device 40. The throttle opening and the throttle opening speed are highly correlated with vehicle acceleration, so that the vehicle acceleration can be estimated by the use of one or both of the throttle opening and the throttle opening speed. The engine rotational speed and the gear stage are also similar sensor information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper system for exerting a damping force on a turning action of a front wheel steering system supported at a front portion of a vehicle body comprising:

damping force variable means for varying said damping force;

wherein said damping force variable means varies the magnitude of said damping force through a multistage changeover according to vehicle velocity, vehicle acceleration or both the vehicle velocity and vehicle acceleration.

2. The steering damper system as set forth in claim 1, and further including control means for operating said damping force variable means, said control means changes over said damping force variable means in a multistage manner according to a plurality of predetermined velocity threshold values based on the vehicle velocity or a plurality of predetermined acceleration threshold values based on the vehicle acceleration, and said acceleration threshold values include a function of the vehicle velocity which decreases as the vehicle velocity increases.

3. The steering damper system as set forth in claim 2, wherein said damping force variable means is fixed in a predetermined changeover position within said multistage changeover range when a changeover cannot be achieved notwithstanding the presence of a condition for changing over said damping force.

* * * * *